United States Patent [19]

Davy et al.

[11] 4,401,933

[45] Aug. 30, 1983

[54] MOTOR CONTROL SYSTEM FOR A SINGLE PHASE INDUCTION MOTOR

[75] Inventors: John C. Davy, Winchester; Brian P. Fenton, Totton; John G. Ramage, Eastleigh, all of England

[73] Assignee: International Business Machines Corporation, Armonk, N.Y.

[21] Appl. No.: 315,100

[22] Filed: Oct. 26, 1981

[30] Foreign Application Priority Data

Nov. 28, 1980 [EP] European Pat. Off. ........... 80304294

[51] Int. Cl.³ .............................................. H02P 1/42
[52] U.S. Cl. .................................... 318/778; 318/786
[58] Field of Search ................ 318/778, 768, 786, 779

[56] References Cited

U.S. PATENT DOCUMENTS 3,882,364 5/1975 Wright et al. ........................ 318/786
4,060,754 11/1977 Kirtley, Jr. ........................... 318/768

FOREIGN PATENT DOCUMENTS 1464454 9/1974 Australia .
1347191 2/1972 Fed. Rep. of Germany .

OTHER PUBLICATIONS

"Coaxial Drive for Magnetic Disk File", IBM TDB, vol. 23, No. 3, Aug. 1980, p. 1198.

*Primary Examiner*—David Smith, Jr.
*Attorney, Agent, or Firm*—R. E. Cummins; G. E. Roush

[57] ABSTRACT

A single phase induction motor control system employs power line assisted starting and runs at higher than power line frequency from an electronically generated inverter supply. This inverter supply is employed to provide an out of phase mains frequency signal to the run winding during starting in order to create the rotating magnetic field needed to start the motor. After the motor has started, the power line supply is disconnected from the start winding and the inverter supply frequency is increased gradually to a final value corresponding to the desired operating speed. In this system no phase shifting capacitors are needed to provide the out of phase starting voltage and the run winding is optimized for running conditions.

5 Claims, 9 Drawing Figures

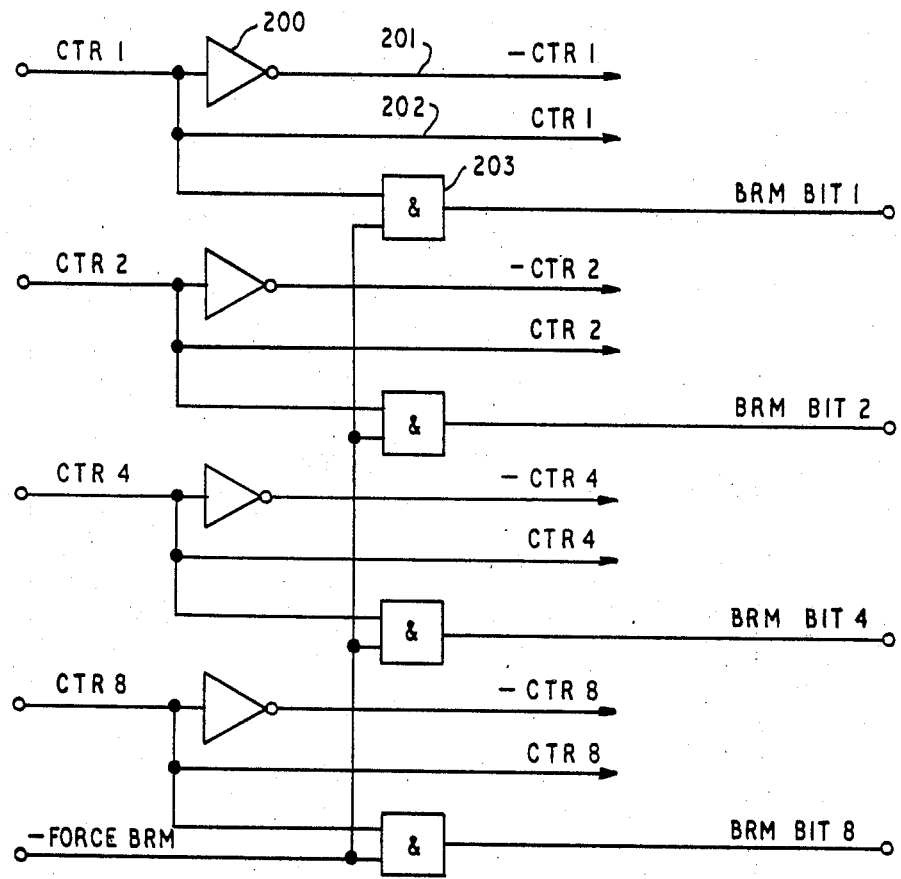
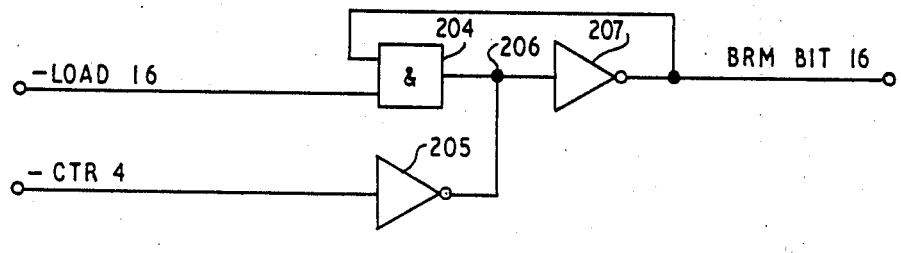
FIG. 4

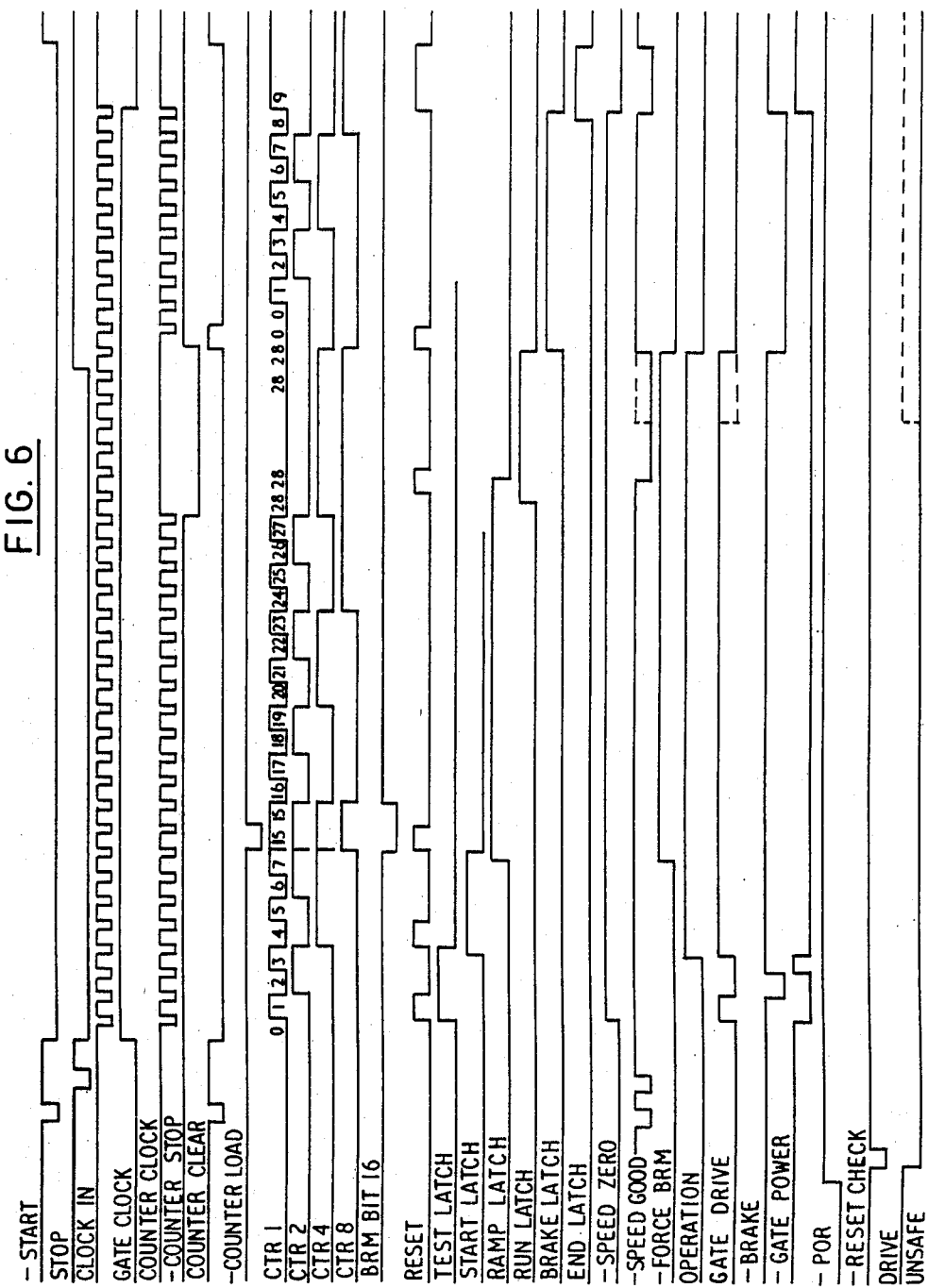

MOTOR CONTROL SYSTEM FOR A SINGLE PHASE INDUCTION MOTOR

Technical Field of the Invention

The invention relates to motor control systems for controlling a single phase induction motor.

BACKGROUND OF THE INVENTION

A single phase induction motor comprises essentially a wound annular laminated stator, which is energized by a single phase a.c. supply, and a shorted rotor of the cage type in which voltages are induced by the variation of primary voltage in the stator winding. The application of single phase a.c. to the stator run winding creates an oscillating magnetic field which provides a torque to drive the motor once it is rotating. However, the oscillating field alone will not start the motor. In order to start this type of motor an auxiliary or start winding is provided which is spatially displaced around the stator from the run winding. The supply voltage is applied to both windings but is time phase shifted in the start winding. This phase shift causes a rotating rather than an oscillating field to be produced, which is sufficient to cause the rotor to turn.

Many ways of effecting this phase shift are known, the simplest being to make the run and start windings of different inductance. This is the so-called "split-phase" motor. Another equally common technique is to employ a phase shifting capacitor which allows a more efficient 90° phase shift to be introduced. The start winding is switched out of circuit when the motor is rotating so that the motor runs solely on the single phase a.c. supplied to the run winding. This aspect of single phase motor operation is very well known and is discussed in various books on the subject. One such book, for example is, "Electric Motors Handbook", McGraw-Hill Book Company, 1978 in which Chapter 7 is of particular interest.

A single phase supply motor which is not only started but also run as a two-phase motor by a somewhat different method is shown in UK Pat. No. 1,464,454. As with conventional single phase motors, two spatially displaced windings are provided on the stator one of which is supplied directly with a.c. The other winding is centre tapped and each half of this winding may be supplied with rectified mains (power line) voltage by way of a respective thyristor. A gating circuit switches the thyristors alternately at predetermined points in the mains cycle so that the second winding is energized with an alternating, though not sinusoidal, voltage which is phase shifted from the power line (mains) by a fixed amount. Because of the phase shift a rotating field is produced which starts the motor. In this case the two phase arrangement is also used to run the motor as well.

In many applications, the a.c. supply to the run winding of a single phase induction motor is not provided directly from the power line (mains) but is provided electronically from, say, an inverter. UK Pat. No. 1,347,191 shows such a system and points out that under constant speed and constant load running conditions, the power required to run such a motor is often very much less than that which is needed for starting. This means that the inverter must be designed to provide starting currents very much in excess of those needed during running. The patent proposes the use of the a.c. power line to supply the high currents needed during starting after which the motor is switched to the electronically generated a.c. supply for running. The generated a.c. is synchronized with the power line prior to switchover. In this way the generating circuit (inverter) need only be designed for running conditions.

A similar arrangement to that of UK Pat. No. 1,347,191 is decribed in an article by R C Treseder entitled "Coaxial Drive for Magnetic Disk File" published in the IBM Technical Disclosure Bulletin, Volume 23, No 3, August 1980, page 1198, which shows a four pole three phase induction motor for driving a magnetic disk file. The optimum supply frequency for the operating speed of the disk file is 120 Hz which is provided to the motor by an oscillator driven three phase power amplifier. To provide higher starting torque than would be available from the 120 Hz generated supply, the motor is started by connection to three phase a.c. power line. When the motor has reached its mains synchronous speed, which is sufficient for the heads to fly, the power line is disconnected and the 120 Hz supply switched to drive motor.

DISCLOSURE OF THE INVENTION

Thus the prior art has recognised the benefits of power line starting and electronically driven running for a.c. induction motors in certain applications. Considering further the example of a magnetic disk file in which normally flying transducer heads start and stop in contact with the disks, a high starting torque is essential to achieve the minimum flying speed as soon as possible thus minimising wear on the disks. This high starting torque can best be provided by the power line. To maximise the starting torque with a power line supply a four pole motor is desirable. This is because the synchronous speed of an induction motor is determined by the number of poles and by the frequency of the supply and the maximum torque is attained at a speed just below synchronous speed. In the case of a power line frequency four pole motor the synchronous speed is 1500 r.p.m. at 50 Hz and 1800 r.p.m. at 60 Hz which speeds are sufficient for the heads to fly.

The torque/speed characteristics of induction motors are such that the torque, after reaching a maximum just below the synchronous speed, then falls sharply to zero at the synchronous speed. The typical operating speed of a magnetic disk file is around 3000 r.p.m. and cannot, therefore, be reached by continuing to run the motor with the power line frequency torque/speed characteristic which is employed to start it. If the frequency of the supply is approximately doubled, however, the synchronous speed is doubled and the motor can attain the necessary operating speed.

Once the heads are flying, high acceleration is no longer required to reach operating speed. Also, once at operating speed, the load remains constant and the running power is relatively low. Thus, an electronic type power supply at twice mains frequency need only provide about one tenth of the power required during starting to complete the acceleration and run the motor. The lower power requirement and the doubled frequency also have the advantage that the motor runs in a relatively defluxed state thereby significantly reducing vibration.

The system proposed in the Treseder article, referenced above, appears capable of offering some of these advantages but shows a three phase motor which necessarily requires a three phase power line supply and a three phase inverter supply. Three phase power line supplies are rarely available and three phase motors and inverters are more complex than single phase. The system would be considerably simpler and cheaper if a single phase induction motor could be used requiring only a single phase power line supply and a single phase inverter.

This is achieved in combination with an economic starting technique for a single phase induction motor according to the invention which provides a motor control system for controlling a single phase induction motor having a cage rotor and a stator with first and second windings spatially displaced in phase from each other, the system comprising sequencing means for sequentially indicating stages of motor operation including an initial start stage, a switchable power line connecting means arranged to connect single phase alternating mains voltage to the first stator winding during the start stage and to disconnect the power line voltage from the first winding at the end of the start stage, a driver circuit responsive to a periodic drive control signal to apply a correspondingly alternating voltage to the second stator winding, and drive control signal generating means for providing such a periodic drive control signal to the driver circuit both during and after the start stage, the drive control signal having, during the start stage, a fixed phase shift with respect to the power line voltage so that a rotating magnetic field is created to start the motor.

By employing the alternating single phase voltage from the driver circuit not only to run the motor after the start stage but also to provide an out of phase voltage to the second stator winding during the start stage, the need for additional phase shifting components such as capacitors is avoided. Furthermore, the need for the second winding to be balanced with the first and to carry power line current is removed. Instead the second winding can be optimized for run conditions rather than have to be a design compromise between start and run conditions.

Preferably the drive control signal generating means is arranged to increase the frequency of the drive control signal subsequently to the start stage allowing advantage to be taken of the altered torque/speed characteristics which result from the frequency increase. The frequency can be increased in ramp fashion.

The drive control signal generating means can advantageously includes power line sensing means for deriving a first drive control signal from the line voltage, and a variable frequency signal source for generating a second drive control signal of variable frequency, the system further comprising switchable connecting means responsive to indications from the sequencing means to connect the first drive control signals to the driver circuit during the start stage and to connect the second drive control signals to the driver circuit subsequently to the start stage.

Another preferred feature of the invention is that the driver circuit power output is limited so that the major proportion of power to the motor during the start stage is provided by the power line. The drive circuit only has to provide enough power during starting to get the motor to turn. It is not ncessary that the drive to the run and start windings be balanced during the start stage. Thus the driver circuit can be designed to provide only the relatively low power consumed during running. The limitation of driver circuit power is preferably achieved by limiting the current through a power amplifying device in the circuit. This may be done by gating off the power amplifying device whenever a predetermined current is exceeded.

Another preferred feature of the invention is that the drive control signals should be square waves, the driver circuit being a switched bridge driver responsive to the sense of the drive control signals to connect a voltage of a respective polarity across the second stator winding. This arrangement has the advantage that a sinusoidal waveform does not have to be provided and the motor will start and run with a simple square wave drive from the electronic supply.

BRIEF DESCRIPTION OF THE DRAWING

The invention will now be described, by way of example only, with reference to a preferred embodiment thereof as illustrated in the accompanying drawing, forming a part of the specification, and in which:

FIG. 4 shows a counter buffer forming part of a control circuit employed in the system of FIG. 1;

FIG. 6 shows various waveforms occurring in the system of FIG. 1 and circuits of FIGS. 4 and 5;

DETAILED DESCRIPTION OF THE INVENTION

Figure 1:
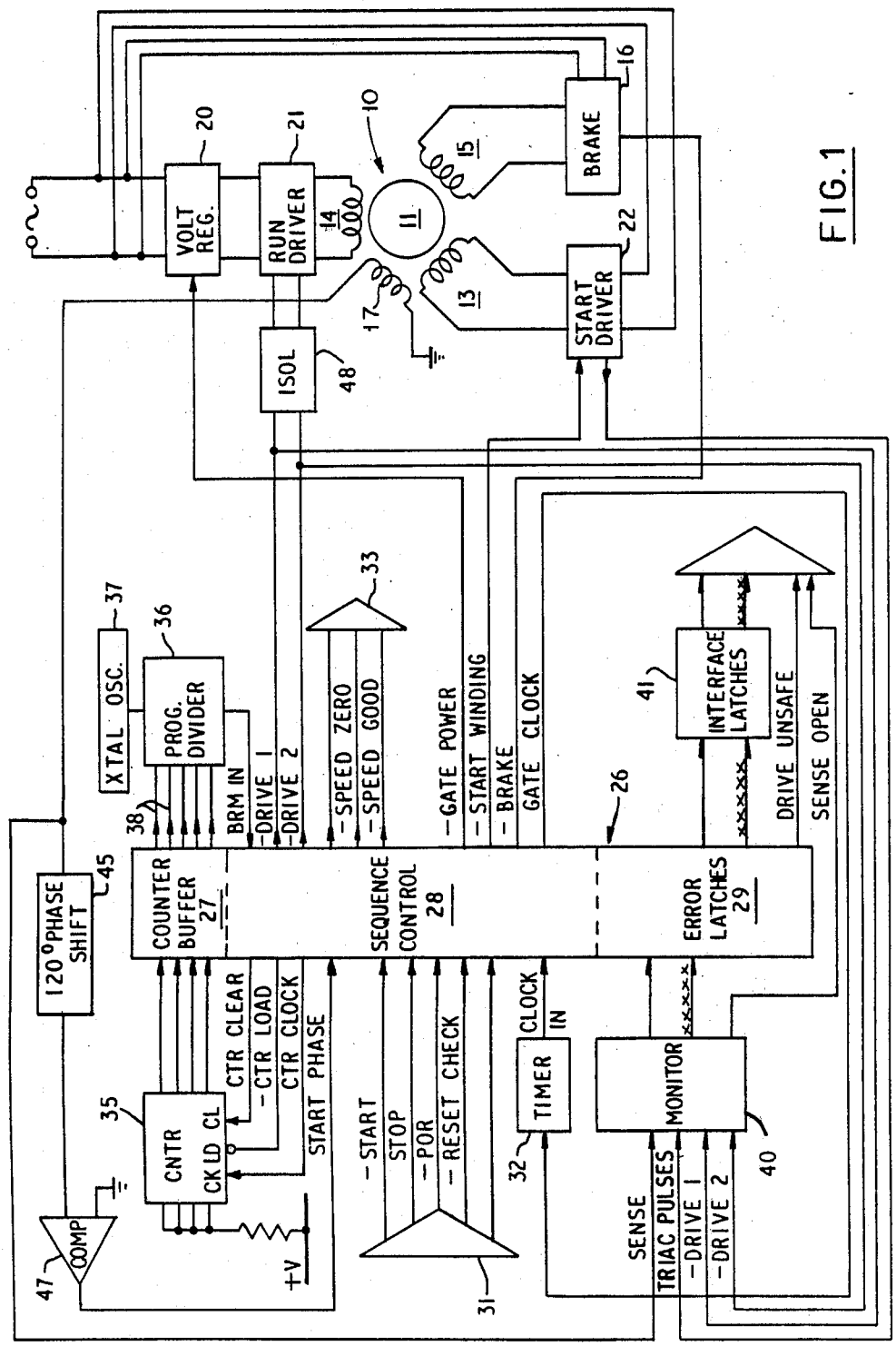
FIG. 1 is a schematic block diagram of a motor control system according to the present invention.

In FIG. 1 is shown a single phase four pole induction motor 10 and an associated motor control system. The motor 10 consists of a squirrel cage rotor 11, illustrated schematically, and a wound laminated stator (not shown) surrounding the rotor and spaced from it by a small air gap.

The windings with which the invention is concerned are primarily a start winding 13, a run winding 14 and a sense winding 17. The sense winding 17 is wound on the same stator teeth as the start winding 13 and inductively senses alternating current applied to the start winding. Also provided is a brake winding 15 for braking the motor. A brake circuit 16 applies d.c. braking current to the winding 16 in response to an input command "—BRAKE". The brake circuit is not relevant to the invention and thus will not be further described.

A voltage regulator 20 supplies a regulated d.c. voltage derived from the power line both to the brake circuit 16 and to a run driver circuit 21 which provides alternating drive current to the run winding 14. The run winding is energised, initially, to help start the motor and, subsequently, to keep it running during normal operation in accordance with the disclosed invention.

A.C. power line voltage is supplied directly to a start driver circuit 22 connected to the start winding 13. The start winding is energised initially by line voltage and provides the bulk of the power necessary to bring the motor up to a minimum operating speed. After the motor reaches this minimum speed the start winding is disconnected and the motor continues to accelerate to its final operating speed under the action of the run winding alone.

Figure 2:
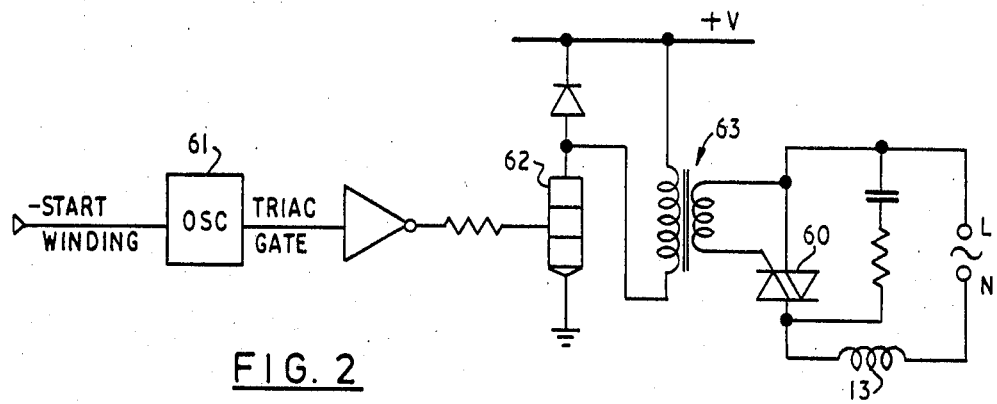
FIG. 2 shows a start driver circuit employed in the system of FIG. 1.

The Start driver circuit 22 is shown in FIG. 2 together with the start winding 13. The circuit simply comprises a triac 60 for switching power line a.c. through the start winding. Gating signals for the triac 60 are produced by a gated oscillator 61 (for example a Texas Instruments type 555) in response to a control signal —START WINDING going low. The gating signals, which are of a frequency of 10 KHz, are inverted and then amplified in a transistor 62 which supplies them to the primary of a pulse transformer 63. The resulting pulses in the transformer secondary all trigger the triac to pass the applied power line a.c. to start winding 13. If the signal —START WINDING goes high the oscillator is gated off and the triac 60 is no longer triggered thus preventing further energisation of start winding 13.

Figure 3:
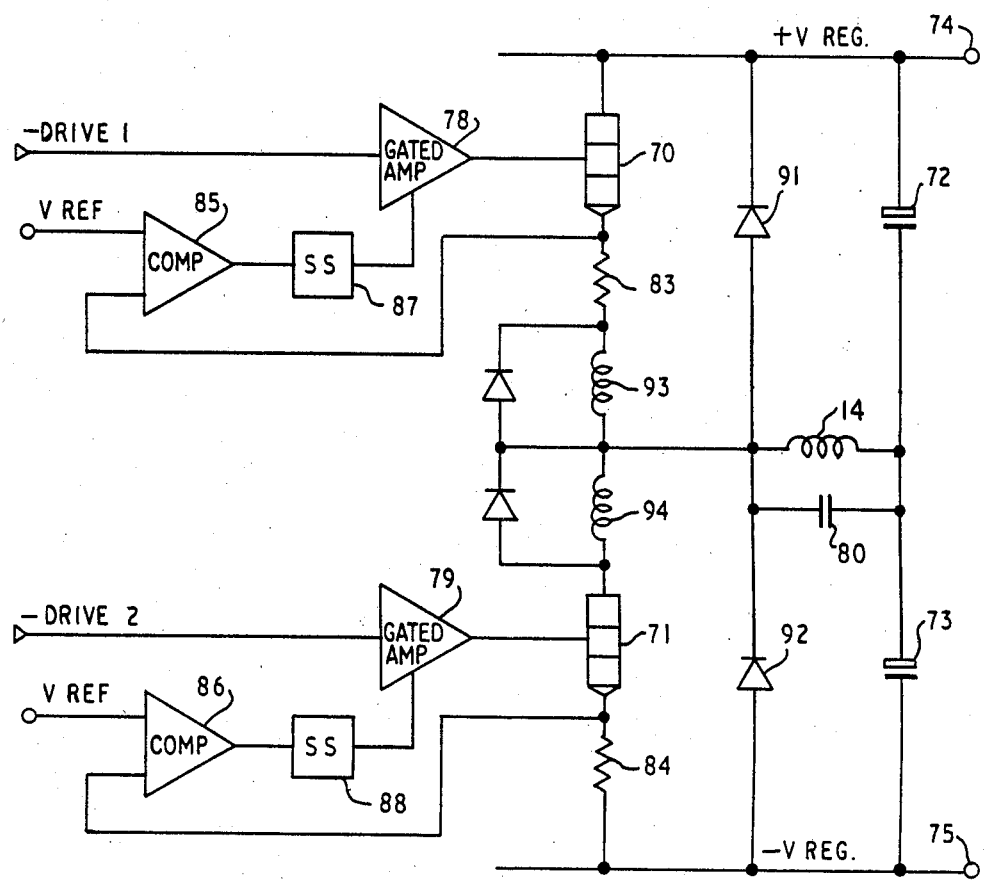
FIG. 3 shows a run driver circuit employed in the system of FIG. 1.

The run driver circuit 21 together with the run winding 14 is shown in FIG. 3. Essentially the winding 14 is connected in a half bridge arrangement between Darlington power transistors 70 and 71 and reservoir capacitors 72 and 73. The d.c. power supply across the bridge is obtained from voltage regulator 20 and is applied across terminals 74 and 75.

Antiphase periodic drive control signals —DRIVE 1 and —DRIVE 2 from a control circuit 26, FIG. 1, are applied via an opto isolator 40 to gated amplifiers 78 and 79 which provide corresponding switching currents to the bases of power transistors 70 and 71. When transistor 70 is on transistor 71 is off and the converse.

Motor drive current thus flows alternately in opposite directions through the parallel combination of run winding 14 and a capacitor 80 to charge and discharge capacitors 72 and 73 in turn so that the junction between the capacitors provides a center tapped supply. The rate of change of voltage through winding 14 is limited by capacitor 80.

The current through each of the transistors 70 and 71 is sensed by means of the voltage developed across one of resistors 83 and 84. This voltage is compared with a predetermined reference maximum allowable voltage $V_{ref}$ in one of comparators 85 and 86. If the allowable current is exceeded the outputs of the comparators gate off their respective amplifiers 78 and 79 for the duration of single shots 87 or 88. The chopping action of this gating circuit reduces the effective r.m.s. voltage across the run winding. The regulated supply applied between terminals 74 and 75 is 230 volts so that a maximum of 115 volts can be switched across the winding 14. However, in the start stage with the motor cold and winding resistance low the application of this voltage would draw much more current through devices 70 and 71 than they can tolerate. The gating circuit prevents such high currents being drawn and its action reduces the effective voltage across winding 14 during starting to some 40 volts. This protective action effectively limits the power output required of the driver permitting a much simpler lower rated driver circuit than would otherwise be required. The limitation of power corresponds to the power required to run the motor at operating speed.

Transistors 70 and 71 are protected against transient overloads when the current through the winding 14 is reversed by means of diodes 91 and 92. One function of inductances 93 and 94 is, together with capacitance 80, to limit transient power dissipated in the transistors 70 and 71 when they are switched. The diodes 95 and 96 together with the diodes 91 and 92 act during switching to clamp the emitter of transistor 70 to the negative rail or the collector of transistor 71 to the positive rail. This ensures that neither transistor is ever subjected to a voltage greater than the full line voltage.

Another function of inductances 93 and 94 is to give short circuit protection to transistors 70 and 71. Thus, if both are on as a result of some fault the rate of rise of current will be slow enough for amplifiers 78 and 79 to be gated off before damage is done to the transistors.

At the heart of the motor control system of FIG. 1 is the control circuit 26 which may be loosely divided into three sections 27, 28 and 29 and which are described in detail in FIGS. 4, 5 and 8 below. The control proper is performed by section 28 which is responsive to external commands from a system interface at 31 such as "STOP" and "—START" commands. Another input to the control section 28 is a source of timing pulses at 1.2 second intervals from a timer 32. The control section 28 primarily comprises a sequencer for causing sequential performance of the motor control operations necessary to start, run and stop the motor. Various stages of motor operation are defined by corresponding latches within control section 28 which are set and reset in a predefined sequence and in response to external commands.

The error latches 29 of circuit 26 are connected to monitor circuit 40 and to interface latches 41, as shown in FIG. 1 for sensing various motor conditions, with the latch states indicating the current stage of the motor operation sequence. This diagnostic information is stored internally in further latches within section 29 and output either directly or by way of a further interface latch buffer 41 to the system.

The operation of the motor control system of FIG. 1, in accordance with the principles of the invention, may be followed with reference to the waveforms of FIG. 6.

In response to a predetermined combination of input commands (—START and STOP both low), the control section 28 of circuit 26 applies the signal —START WINDING (coincident with START LATCH in FIG. 6) to start driver 22 to cause application of single phase power line a.c. to start winding 13. The line frequency may be either 50 or 60 Hz. The presence of mains voltage is detected inductively by the sense winding 17.

The signal on the sense winding is phase shifted by 120° by phase shifter 45. The phase shifted signal is squared by an overdriven comparator to produce a signal "START PHASE" which is applied to control section 28. Because the latches in the control section 28 indicate that the motor 11 is in the starting stage of operation, the START PHASE signal is gated through section 28 and inverted to constitute a pair of opposite phase drive control signals —DRIVE 1, and —DRIVE 2.

These signals, which are logic signals, are converted to power transistor switching signals in a conventional optoisolator 48 (for example, Texas Instruments, TIL 112) and applied to the run driver 21. This circuit, as has been described in FIG. 3, is a switching half bridge driver supplied with regulated d.c. from voltage regulator 20. The —DRIVE 1 and —DRIVE 2 signals cause the alternate switching of the regulated d.c. voltage in opposite directions across the run winding 14. The 120° phase relationship between the drive signals and the power line voltage to the start winding is equivalent to a 90° phase relationship between the currents in the start and run windings. This is because the current in the start winding lags the applied voltage by about 30°. The out of phase currents in the two windings cause a rotating magnetic field to be created in the motor air gap which starts the rotor turning.

Once the rotor is rotating, most of the power needed to provide a high starting torque is drawn from the power line. The out of phase signal to the run winding is primarily needed to cause the initial movement and the continued supply of out of phase drive signals to the run winding has relatively little effect on the starting torque. The start stage is terminated after a predetermined time indicated by counter 35. At this time the line supply is disconnected from the start winding 13 in response to a change of state of the control signal —START WINDING. At this point the motor is turning at around 50% of its final operating speed.

The motor operation now enters a ramp stage in which the motor runs on alternating current supplied to its run winding 14 alone and the frequency of that current is increased in ramp fashion to that corresponding to the final operating speed.

After the start stage terminates the control section 27 no longer derives the drive control signals —DRIVE 1 and —DRIVE 2 from the START PHASE signal but instead from the variable frequency signal BRM IN from programmable divider 36. AT the beginning of the ramp stage, the counter 35 is loaded in response to the signal —CTR LOAD and counter buffer control section 27 gates the counter output to determine the division ratio of the programmable divider. With the counter in a loaded state, the input lines 38 to the divider are in the state 01111 corresponding to a frequency of BRM IN of 55 Hz.

During the ramp stage, the counter 35 is incremented periodically in response to pulses from timer 32 and the frequency of BRM IN is increased in steps from 55 to 100 Hz. The drive signals —DRIVE 1 and —DRIVE 2 also increase correspondingly in frequency with the result that the motor accelerates steadily to reach its operating speed at the end of the ramp.

The ramp stage of motor operation now terminates and the sequence progresses to the run stage. In this stage, the 100 Hz drive signals continue to be applied to the run winding until the operation is terminated by the STOP external command going high or by the occurrence of a fault condition such as the "DRIVE UNSAFE" signal from diagnostic control section 29.

Upon termination of the run stage the motor operation sequence enters a braking stage in which the drive signals to the run winding are removed and the brake winding 15 is energised by way of the brake circuit 16 to bring the motor to rest.

The employment of the electronically generated signals —DRIVE 1 and —DRIVE 2 to provide the out of phase starting current, synchronized with the mains has several advantages. One of these is that power line starting of a single phase induction motor is achieved without the need for a large phase shifting capacitor. Perhaps more important is that no compromise between start and run winding design is necessary. The two windings do not have to be balanced and carry the same currents but instead each may be optimized for start and run conditions respectively. Thus the start winding is designed for full line voltages ranging from 180 to 260 volts r.m.s. whereas the run winding is designed for a voltage range of from 40 to 115 volts r.m.s. The run winding to start winding turns ratio is 3 to 5. If a compromise over voltages were necessary, the run winding would need more turns and would produce less torque and run hotter.

Figures 5, 5A:
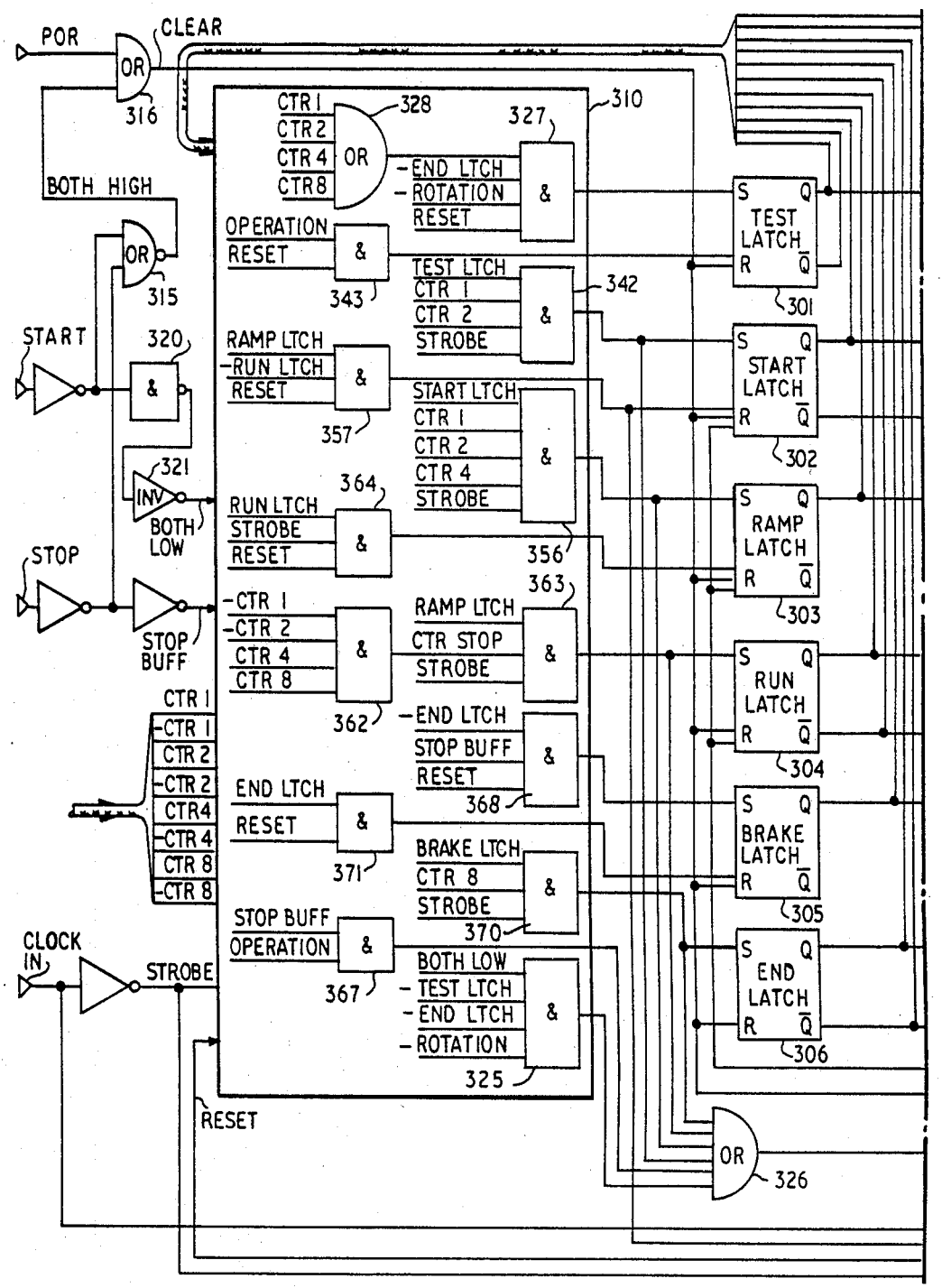
FIGS. 5, 5A and 5B shows a sequence controller and other details of the same control circuit employed in FIG. 1.
Figure 5B:
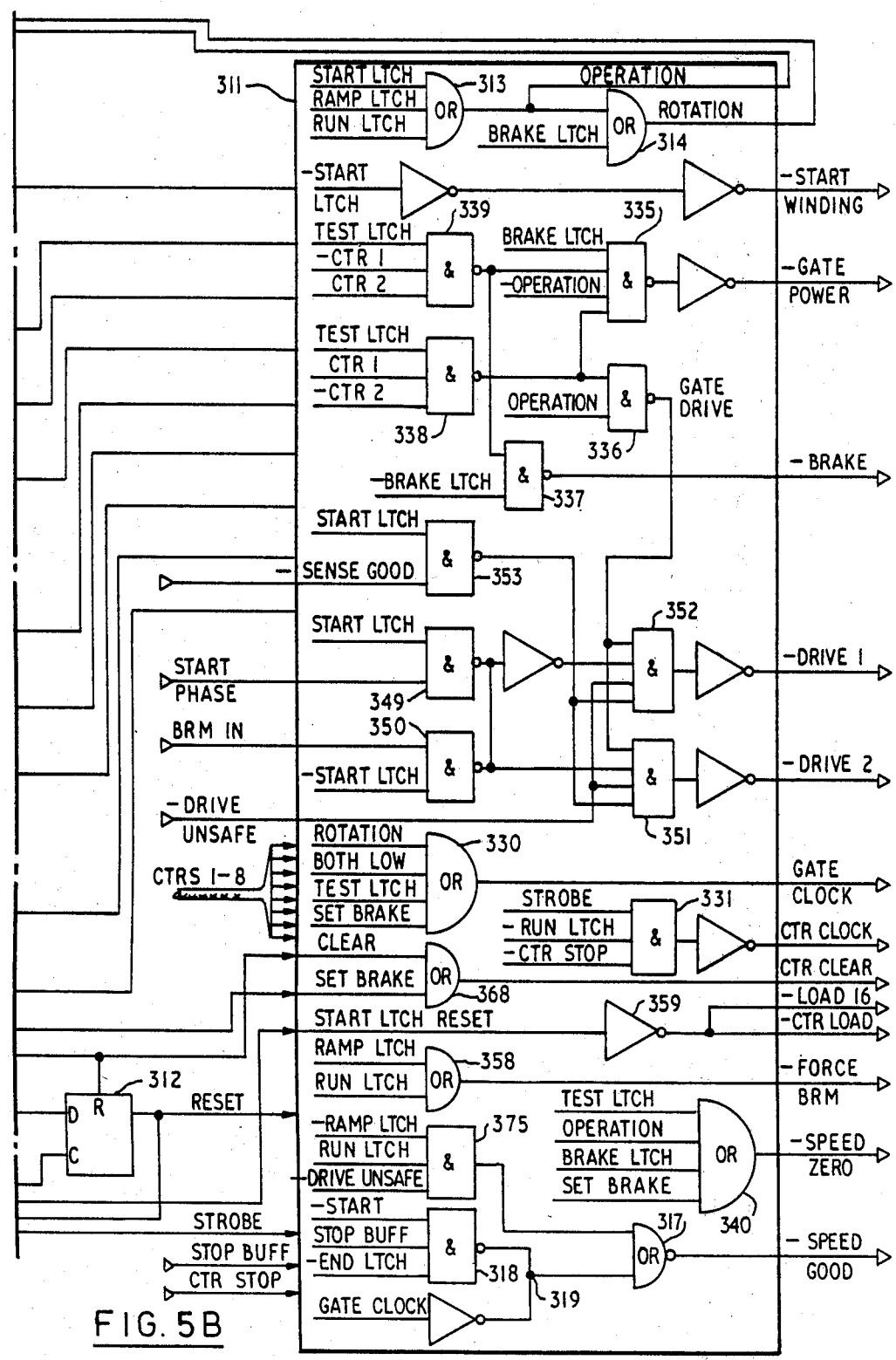

Details of counter buffer 27 and of the control portion 28 of control circuit 26 are shown in FIGS. 4 and 5 respectively. The operation of these portions of control circuit 26 will now be explained in detail with reference to the timing diagram of FIG. 6.

Taking first the counter buffer of FIG. 4 it can be seen that the four outputs CTR1, CTR2, CTR4 and CTR3 (see FIG. 6) of counter 35 are applied to buffer 27 and inverted by inverters such as 200. The four counter bit values and their inverses are made available on lines such as 201 and 202 to the control portion 28. The true counter bit values are also applied to AND gates such as 203 so that, if a gating signal —FORCE BRM (FIG. 6) from control portion 28 is high, they appear as signals BRM BIT 1, 2, 4 and 8 on four of the input control lines 38 (FIG. 1) to the binary rate multiplier of the programmable divider 36. If —FORCE BRM is low all the signals BRM BIT 1, 2, 4 and 8 are zero.

A fifth input line 38 carries a signal BRM BIT 16 (FIG. 6) which is generated by a latch circuit whose inputs are —CTR4 and a signal —LOAD 16 from control portion 28. The latch is set when —CTR4 is high and reset by the —LOAD 16 signal. The latch consists of NAND 204 and inverter 205 the outputs of which are dot ORed at junction 206 and inverted by inverter 207.

The control portion 28 of circuit 26 is illustrated in detail in FIG. 5. Various waveforms and signals occurring in the circuit portion of FIG. 5 are shown in FIG. 6 to assist in explaining the operation of the circuit.

At the heart of the circuit of FIG. 5 are six latches of the Set/Reset type, each corresponding to a unique stage of motor or motor control operation. The latches consist of Test Latch 301, Start Latch 302, Ramp Latch 303, Run Latch 304, Brake Latch 305 and End Latch 306. The latches are set and reset sequentially by input logic 310 which is a network of logic gates responsive to the external signals shown applied to the circuit 26 in FIG. 1 and also to internally generated signals from all three portions of circuit 26. Because of the large number of gates and inputs the interconnections within input logic 310 have not been shown in detail. Instead the inputs to individual gates have been explicitly identified by name.

The output states of the latches (Q and P or Q), as well as being fed back to the input logic 310, are also applied to output logic 311. Output logic 311 is a network of logic gates providing the various control and drive signals emerging from portion 27, FIG. 1, to other parts of the motor control circuit, for example the —DRIVE 1 and —DRIVE 2 signals to the run driver circuit 21. As with input logic 310 not all the interconnections of the output logic 311 are shown but instead the inputs to individual gates are explicitly identified.

Another component of the control circuit portion of FIG. 5 is a latch 312 of the Data/Clocked type. In response to signals from the gates of input logic 310, this latch, at clock times defined by the signal CLOCK IN from timer 32, generates RESET pulses which are fed back to the same gates to step the latches through their sequence.

Two frequently occurring signals which are simply combinations of the outputs of certain latches are OPERATION, which indicates that the motor is starting or running, and ROTATION which indicates that it is starting, running or braking. An OR gate 313 produces the signal OPERATION and a further OR gate 314 produces ROTATION.

The sequence of operation is as follows: External control signals —START and STOP are initially high prior to motor operation and are inverted and combined by NOR gate 315 to produce a BOTH HIGH signal. This signal passes through OR gate 316 to produce a CLEAR signal which is effective to reset all latches 301-306 and also to clear the counter 35.

Before the motor is allowed to start, a checking and testing cycle is carried out. Firstly, the —START and STOP signals go low consecutively. The correct operation of the input control lines carrying these signals to interface 31 is confirmed by the generation of two negative pulses in the signal —SPEED GOOD which is provided to the system interface 33. The signal —SPEED GOOD, in this instance, is produced from NOR gate 317 in response to the application of —START and a delayed version STOP BUFF of the STOP signal to a NAND circuit 318. The output of the NAND 318 is applied to NOR 317 by way of a dot OR junction 319.

After this line check operation, the —START and STOP signals both go high again. Subsequently, both lines go low and this is the start of the motor control operation proper. A signal BOTH LOW is generated by NAND gate 320 and inverter 321. This signal is applied to an AND gate 325 whose other inputs are all positive since all latches are in their reset state. The output of AND 325 by way of an OR 326 generates the first RESET pulse from latch 312. This RESET pulse is applied to another AND gate 327 whose output sets the Test latch 301. The other inputs to AND 327 indicate that no other latch is set and that, as a result of the application of the signal CTR CLOCK, the counter 35 has incremented from zero. The latter input indicating a non zero count, is provided by OR 328.

The incrementing of the counter 35 is also a result of the same BOTH LOW signal which by way of OR 330 generates a signal GATE CLOCK. This signal enables the timer clock 32 which produces the CLOCK IN timing pulse train. The CLOCK IN signal is inverted to produce a signal STROBE which in turn is applied to an AND gate 331. In the absence of a signal CTR STOP and providing the Run Latch is reset, STROBE is gated through AND 331 and inverted to produce the signal CTR CLOCK which increments counter 35.

The setting of the Test Latch thus indicates that the necessary clocking signals and RESET pulses are being properly generated. Before proceeding to the Start stage of operation, the setting of the Test latch is first used to cause the control signals GATE DRIVE —GATE POWER and —BRAKE (see FIG. 6) to be generated for Test purposes. These signals are generated by three NAND gates 335, 336 and 337 if any of the inputs to these gates go low. Two of these inputs are provided by additional NAND gates 338 and 339 which, while the Test latch is set, go low at counts of 1 and 2, respectively to cause the generation of respective signals by NAND gates 335, 336, and 337. While the Test latch is set, the other inputs to these NAND gates —OPERATION and —BRAKE LTCH remain high. Setting of the Test latch generates the signal —SPEED ZERO via an OR gate 340 to the system interface 33.

When the counter 35 reaches a count of 3, the Start latch is set upon receipt of the next Strobe pulses by an AND gate 342. This generates a Reset pulse from latch 312 at the reset positive clock edge. Since the Start latch is set, OPERATION is now high and an AND 343 resets the Test latch. Simultaneously, the signal —GATE POWER goes down, activating the voltage regulator 21, and GATE DRIVE goes up to enable passage of the signals —DRIVE 1 and —DRIVE 2 to the Run driver 21.

Once the Start latch 302 is set, the motor is energised as explained in connection with FIG. 1. The signal —START LTCH is buffered by inverters 344 and 345 and emerges as —START WINDING. This enables the start driver circuit 22 to apply line voltage to the start winding 13.

A switching circuit including AND gates 349 and 350 receives both the signals START PHASE and BRM IN as inputs. NAND 349 is enabled by the Start latch to apply the START PHASE signal to an AND gate 351 and its inverse to an AND gate 352. Thus, the drive control signals —DRIVE 1 and —DRIVE 2 are provided by the START PHASE signal during the Start stage. When the Start latch is later reset, the signal BRM IN constitutes the input instead. The two AND gates 351 and 352 must be enabled by GATE DRIVE and not inhibited by diagnostic signals DRIVE UNSAFE and SENSE GOOD, the latter being NANDed with START LTCH by gate 353.

Thus as a result of the setting of the Start latch, line voltage is applied to the start winding and simultaneously drive control signals are applied to the run driver to cause a synchronised but out of phase energisation of the run winding. The resulting rotating magnetic field, as explained above, causes the rotor to begin to rotate. The high power available from the line and the relatively low line frequency maximise the torque to accelerate the motor as rapidly as possible up to a minimum operating speed.

The application of line power to the start winding continues until the Start stage of the sequence is terminated. This happens when the counter reaches a count of 7 and the Ramp latch 303 is set by the immediately following Strobe pulse by way of an AND gate 356. This automatically generates a Reset pulse which resets the Start latch by way of AND 357. As soon as the Start latch goes down, the signal —START WINDING is removed from the start driver circuit 22 and the start winding 13 is no longer energized.

Also when the Ramp latch is set the signal —FORCE BRM, produced by OR gate 358, goes high and the programmable divider 36 is set in accordance with the contents of the counter 35 and the value of the BRM BIT 16. These values are not significant until the Start latch is reset causing the generation of signals —LOAD 16 and —CTR LOAD from inverter 359. The —LOAD 16 signal forces BRM BIT 16 low and the —CTR LOAD signal sets all the counter 35 outputs to 1. The programmable divider 36 thus receives a control word 01111 on lines 38 which corresponds to an output frequency of approximately 55 Hz. The frequency of drive signals —DRIVE 1 and DRIVE 2 to the run driver is thus forced to this value at the start of the frequency ramp as the controlling input is now BRM IN to AND 350. The frequency of 55 Hz is chosen as a compromise between the two possible mains frequencies of 50 and 60 Hz.

After the counter 35 has been loaded it is incremented by the subsequent CTR CLOCK pulses so that the frequency of BRM IN increases in twelve steps until it corresponds to the final required operating frequency. This condition is indicated by the setting of the Run latch 304 at a count of 12 by way of AND gates 362 and 363. The output of AND gate 362 is a signal CTR STOP which removes the CTR CLOCK signal by inhibiting AND gate 331. The counter contents are frozen and the state of the lines 38 is fixed at 11100, corresponding to a frequency of BRM IN of approximately 100 Hz. The setting of Run latch 304 produces another RESET pulse to reset Ramp latch 303 by way of AND gate 364. The motor is now running at full operating speed and will continue in this state indefinitely until the external command, STOP, goes high.

When STOP goes high, with —START remaining low, the Run stage of operation is terminated. The buffered signal STOP BUFF causes AND 367 to generate a RESET pulse by way of OR 326 and latch 312. This pulse and STOP BUFF are applied to an AND 368 which produces a signal SET BRAKE to set the Brake latch 305 and simultaneously reset the Run latch. At the same time, a pulse CTR CLEAR, produced by OR 368, clears the counter 35 and —CTR STOP returns high thus freeing the counter once again. The signal OPERATION goes low as does GATE DRIVE, removing the drive signals from the run winding driver circuit 21. The —BRAKE signal is produced by NAND 337, in response to the setting of the Brake latch, and causes the operation of the brake circuit 16 which proceeds to stop the motor by a d.c. braking technique.

After counter 35 reaches a count of 8, the braking is complete and the End latch 306 is set by AND 370 upon receipt of the next Strobe pulse. A final RESET pulse is generated, by way of AND 370, which, applied to a further AND 371, resets the Brake latch. The signal ROTATION produced by OR 314 goes low and the signals GATE CLOCK, —GATE POWER and —BRAKE change state to terminate their respective operations. Also the signals —SPEED GOOD and —SPEED ZERO to interface 33 both go low.

In response to the dropping of these two signals at interface 33, the external system subsequently raises the external signal —START. The signal BOTH HIGH is once again produced by OR 315 and the resulting CLEAR pulse from OR 316 clears all latches and the counter. The resetting of the End latch is verified to the system when —SPEED GOOD is driven high again by the output of NAND 318.

Should the DRIVE UNSAFE signal have gone high for any reason during the Run stage of motor operation, as indicated by the dotted lines in FIG. 6, then —SPEED GOOD rises immediately as a result of an output from an AND gate 375 and GATE DRIVE falls to remove the drive signals from driver 21.

Figure 7:
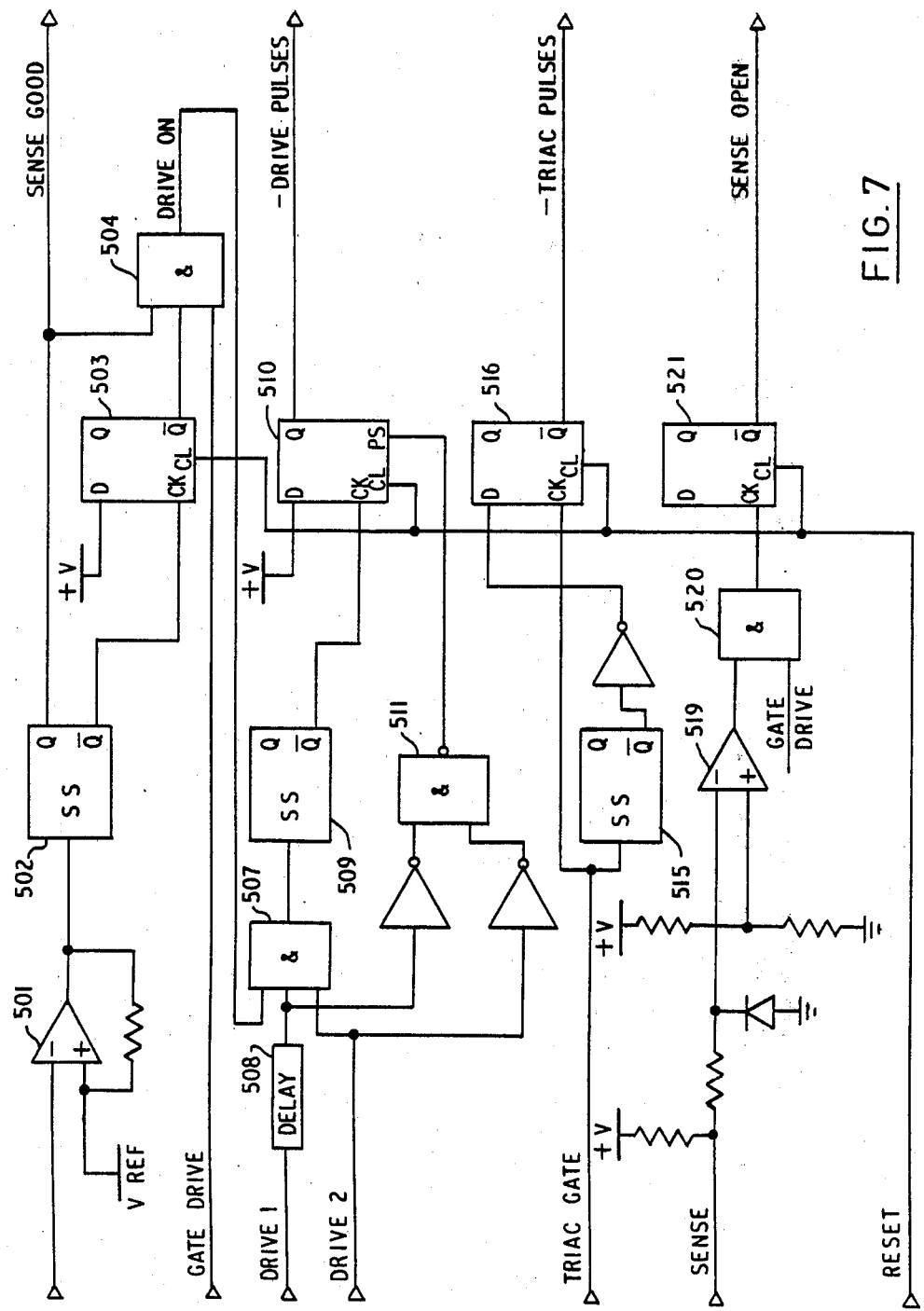
FIG. 7 shows a monitor circuit employed in the system of FIG. 1.
Figure 8:
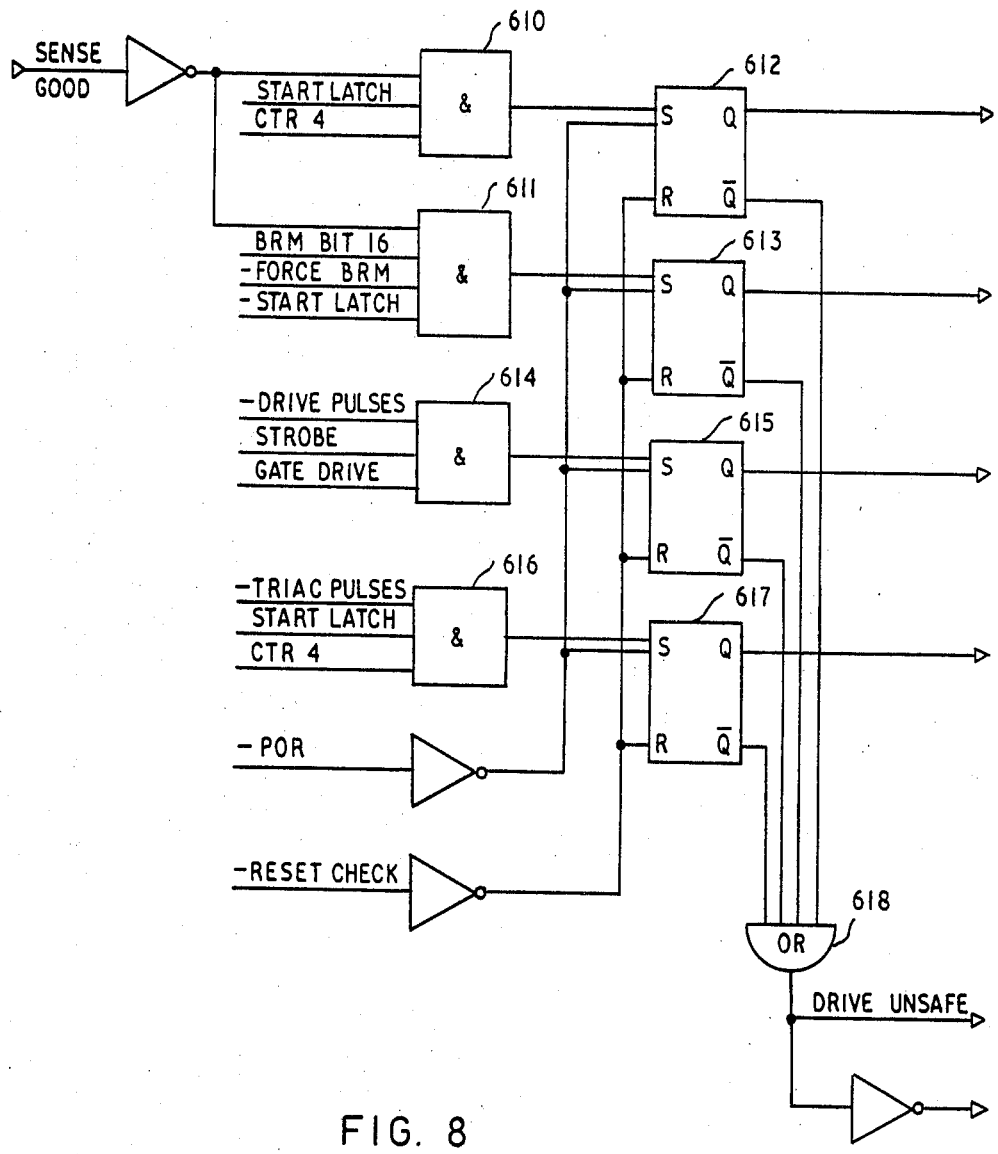
FIG. 8 shows an error latch portion of the control circuit employed in FIG. 1.

The remaining portion 29 of control circuit 26 is shown in FIG. 8. As shown the circuit is simply a number of latches, each of which captures outputs from monitor circuit 40 details of which are shown in FIG. 7.

The inputs to the monitor circuit of FIG. 7 are SENSE which is the output of sense winding 44 (FIG. 1), the drive control signals —DRIVE 1 and —DRIVE 2 and the triac pulses from Start driver 22.

Considering FIG. 7 first, the SENSE signal is compared with a predetermined voltage reference by a differential amplifier 501. The output of the amplifier is applied to trigger a single shot 502 whose period is 200 mS. Providing the SENSE voltage exceeds the threshold voltage, its oscillations will keep the single shot 502 triggered so that its Q output is always high. This signal is the SENSE GOOD signal.

The Q output of single shot 502 is low as long as SENSE GOOD is high and thus does not alter the initially cleared state of a flip-flop 503. The Q output of flip-flop 503 is gated with SENSE GOOD and the signal GATE DRIVE in AND gate 504 to produce a signal DRIVE ON.

The signal DRIVE ON is used to enable a further AND gate 507 to which the drive control signals DRIVE 1 and DRIVE 2 are applied. The DRIVE 1 signal is delayed slightly in delay 508 so that AND 507 produces pulses whenever DRIVE 1 or DRIVE 2 pulses are present. The output pulses of AND 508 trigger a 10 mS single shot 509. If drive pulses do not appear for an interval greater than 10 mS, the Q output of single shot 509 goes high and sets a flip-flop 510. The Q output of this flip-flop is the signal —DRIVE PULSES indicating that the drive pulses have disappeared. Another AND gate 511 will set flip flop 510 if either DRIVE 1 or DRIVE 2 is stuck high.

A further output of the monitor circuit is the signal —TRIAC PULSES. This, when high, indicates the absence of triac pulses in the Start driver 22 which should be produced in response to the signal —START WINDING. Again a timing out single shot 515 and data/clock flip-flop 516 are used.

Finally, the occurrence of an open circuit in the sense winding 17 is monitored by applying the SENSE signal to a differential amplifier 519. The output is half wave rectified and gated by the signal GATE DRIVE through an AND gate 520 to the clock input of a flip-flop 521. If no pulses are present the flip-flop 521 will revert from its initially cleared state to its set state causing the signal SENSE OPEN to be produced.

The signal SENSE OPEN bypasses error latches 29 and is applied directly to the interface latches 41. The other signals are however applied to error latches 29 as shown in FIG. 8.

In FIG. 8, the SENSE GOOD signal is inverted and applied to AND gates 610 and 611 whose outputs set latches 612 and 613 respectively. Latch 612 is set if SENSE GOOD goes low during the Start stage of operation and latch 613 is set if SENSE GOOD goes low after the Start stage.

The signal —DRIVE PULSES is gated by GATE DRIVE through AND 614 to set a latch 615. The signal —TRIAC PULSES is gated ty START LTCH and CTR4 through an AND 616 to set a latch 617.

Should any of these latches 612, 613, 615 and 617 be set, the DRIVE UNSAFE signal is produced by OR 618. All four latches are initially set by POR and can be reset for test purposes by the signal RESET CHECK.

The preferred embodiment of the invention described above with reference to FIGS. 1 to 8 is only one example of how the invention may be put into practice. Within the scope of the invention as broadly disclosed and claimed, many changes and alternatives are possible.

For example, in the preferred embodiment, the drive control signals to the run driver circuit are derived from sensed line voltage during the Start stage and from a separate oscillator during the Ramp and Run stages. It would be equally possible to derive the drive signals to the run winding entirely from a variable frequency oscillator and synchronise the oscillator output with the line by means of a phase locked loop during the Start stage.

Also although the drive control signals applied to the Run driver are essentially switching signals of square wave form, there is no reason why sinusoidal signals could not be employed and applied after amplification by way of triac devices to the run winding.

Many aspects of the motor control operation in the preferred embodiment are essentially open loop for example the durations of the start, ramp and brake stages are determined by a counter. It would be possible to define these stages by monitoring the motor speed. If speed were monitored in this way, closed loop control of the frequency ramp and of final speed could be employed. In this case a smooth rather than a staircase ramp function could also be employed.

The invention claimed is:

1. A system for rotating a member from a rest position to a predetermined constant operating speed comprising a single phase induction motor and a motor control system;

said single phase motor comprising:
 (1) a cage type rotor coupled to said member; and
 (2) a stator having at least:
  (a) a run winding; and
  (b) a start winding spatially displaced in phase from said run winding;

said control system comprising:
 (1) first switch means for selectively connecting a single phase alternating power line voltage to said start winding in response to a start control signal, said alternating power line voltage having a constant frequency which is substantially below the optimum supply frequency for rotating said motor at said constant operating speed;
 (2) means selectively connectable to said run winding for developing a rotating magnetic field to cause initial rotation of said member from said rest position;
 (3) a run drive circuit for supplying a run voltage to said run winding including means for varying the frequency of said run voltage between a frequency approximating the frequency of said power line voltage and said optimum supply frequency of said motor in accordance with a speed control signal; and
 (4) second switch means for selectively switching said run winding between said rotating magnetic field developing means and said run drive circuit in response to a run control signal; and
 (5) means for supplying said control signals to said first and secnd switch means in a predetermined sequence which causes
  (a) said start winding and said run winding to be initially energized simultaneously to produce a high starting torque which rapidly accelerates said motor to a minimum operating speed determined by said constant frequency;
  (b) said start winding to be disconnected from said line voltage and said run winding to be switched to said run driver circuitry after a predetermined time; and
  (c) the frequency of said run voltage to be increased to said optimum supply frequency to accelerate said motor to said constant operating speed.

2. The system recited in claim 1 in which said means for developing a rotating magnetic field includes a third winding disposed on said stator and inductively coupled to said start winding.

3. The system recited in claim 2 in which said run drive circuit includes a variable frequency oscillator.

4. The system recited in claim 3 in which said means for supplying said control signals in a predetermined sequence includes a timing circuit for establishing said predetermined time and the rate at which the frequency of said run voltage is increased.

5. The system recited in claim 4 in which said run winding and said start winding have been optimized to perform their intended function so that considerably less power is consumed when said motor is running at said predetermined constant operating speed.

* * * * *